US007882515B2

(12) United States Patent
Maetz et al.

(10) Patent No.: US 7,882,515 B2
(45) Date of Patent: Feb. 1, 2011

(54) DEVICE AND PROCESS FOR ACQUIRING FILES BY ACCUMULATION OF POINTS AND ASSOCIATED PRODUCTS

(75) Inventors: Yves Maetz, Melesse (FR); Franck Hiron, Chateaubourg (FR)

(73) Assignee: Thomson Licensing, Boulogne-Billancourt (FR)

( * ) Notice: Subject to any disclaimer, the term of this patent is extended or adjusted under 35 U.S.C. 154(b) by 964 days.

(21) Appl. No.: 10/540,146

(22) PCT Filed: Dec. 11, 2003

(86) PCT No.: PCT/EP03/50986

§ 371 (c)(1),
(2), (4) Date: Jun. 21, 2005

(87) PCT Pub. No.: WO2004/062235

PCT Pub. Date: Jul. 22, 2004

(65) Prior Publication Data

US 2006/0168617 A1 Jul. 27, 2006

(30) Foreign Application Priority Data

Jan. 2, 2003 (FR) .................................. 03 00008

(51) Int. Cl.
*H04N 7/16* (2006.01)
*H04N 7/173* (2006.01)
*G06Q 30/00* (2006.01)

(52) U.S. Cl. .............................. 725/23; 725/8; 725/46; 725/89; 725/100; 725/104; 725/115; 705/14.11

(58) Field of Classification Search ................... 725/23, 725/8; 705/14
See application file for complete search history.

(56) References Cited

U.S. PATENT DOCUMENTS 6,020,883 A * 2/2000 Herz et al. .................. 715/721

(Continued)

FOREIGN PATENT DOCUMENTS

JP 2002-202989 A 7/2002

(Continued)

OTHER PUBLICATIONS

Search Report Dated Mar. 25, 2004.

*Primary Examiner*—Brian T Pendleton
*Assistant Examiner*—Pinkal R Chokshi
(74) *Attorney, Agent, or Firm*—Robert D. Shedd; Harvey D. Fried; Joel M. Fogelson (57) ABSTRACT

The present invention relates to a device and a process for acquiring files by accumulation of points. The device is designed for a user of a receiver of data of a communication network, able to earn points by accomplishing at least one predefined operation, and to acquire at least one of the files by downloading via this communication network, when the aggregate number of points reaches a predetermined level associated with this file. The device comprises an automatic control module for ordering downloading via this network to a storage space accessible to this receiver, of portions of this file, designed to order the downloading of each of these portions when the number of points earned by this user reaches a fraction of this predetermined level which corresponds to this portion.

13 Claims, 5 Drawing Sheets

U.S. PATENT DOCUMENTS

| | | | |
|---|---|---|---|
| 6,057,872 A * | 5/2000 | Candelore | 725/23 |
| 6,175,871 B1 * | 1/2001 | Schuster et al. | 709/231 |
| 7,389,522 B1 * | 6/2008 | Shintani | 725/8 |
| 7,546,617 B1 * | 6/2009 | Kienzle et al. | 725/23 |
| 2002/0032906 A1 * | 3/2002 | Grossman | 725/42 |
| 2002/0049967 A1 * | 4/2002 | Haseltine et al. | 725/23 |
| 2002/0133817 A1 * | 9/2002 | Markel | 725/23 |
| 2003/0167205 A1 * | 9/2003 | Maruyama et al. | 705/14 |
| 2003/0172376 A1 * | 9/2003 | Coffin, III | 725/22 |
| 2005/0080673 A1 * | 4/2005 | Picker et al. | 705/14 |
| 2005/0193414 A1 * | 9/2005 | Horvitz et al. | 725/46 |
| 2008/0109345 A1 * | 5/2008 | Leach et al. | 705/37 |
| 2008/0195494 A1 * | 8/2008 | Postrel | 705/14 |

FOREIGN PATENT DOCUMENTS

| | | |
|---|---|---|
| JP | 2002-279205 A | 9/2002 |
| WO | WO 01/82597 | 11/2001 |
| WO | WO 02/35433 A1 | 5/2002 |
| WO | WO 02/056530 A2 | 7/2002 |
| WO | WO 02/065732 | 8/2002 |
| WO | WO 02/073967 A2 | 9/2002 |

* cited by examiner

DEVICE AND PROCESS FOR ACQUIRING FILES BY ACCUMULATION OF POINTS AND ASSOCIATED PRODUCTS

This application claims the benefit, under 35 U.S.C. §365 of International Application PCT/EP03/50986, filed Dec. 11, 2003, which was published in accordance with PCT Article 21(2) on Jul. 22, 2004 in English and which claims the benefit of French patent application No. 0300008, filed Jan. 2, 2003.

BACKGROUND OF THE INVENTION

1. Field of the invention

The present invention pertains to a device and to a process for acquiring files by accumulation of points, as well as to an associated interactive terminal and associated computer program.

2. Description of the related art

Advertising plays a key role for service providers, insofar as it gains them a significant share of their income. However, advertising messages being evermore present in our environment, on both television and radio, in newspapers or on Internet pages, consumers might seek to avoid them as much as possible. Techniques developed over the last few years permit in certain cases relatively efficient filterings for achieving same. In particular, digital video recorders make it possible for a program currently being transmitted to be viewed at some other time. One is thus readily able to pass speedily over the advertising pages, so as to start or resume the film or transmission in progress as quickly as possible.

What is more, the multiplicity of information channels is increasing the risk of witnessing a substantial reduction in the scope of the advertisements transmitted on a given channel. In order to overcome the scattering of consumer targets, it is becoming necessary to transmit one and the same advertisement repeatedly on several different channels. This situation, which raises advertising costs, might also have the drawback of giving the public or readers a feeling of insistence and of antagonizing them.

Advertisers are therefore confronted with new situations, which force the existing models to be called into question. To remedy these difficulties and encourage the availability of consumers to advertising messages, several solutions have been proposed. They are based on the active involvement of a viewer, listener or Internet user, who in exchange for his participation, is rewarded with "virtual" credits or points. These points subsequently enable him to acquire benefits, such as in particular invitations to shows or to exhibitions, reductions on purchases or privileged access to pay-per-view transmissions (free or reduction). The consumers' points are for example managed by a server in a specific account, which they can credit by agreeing to watch interactive advertisements or debit by purchasing services or goods.

Using this approach, the public can be made more attentive to advertisements, while giving them an active role and motivating them. An additional advantage of this approach is that it enables better targeting of the consumers at which the advertising messages are aimed, and makes it possible to obtain information about their consumption habits. Employed advisedly, it can thus permit both a selective refinement of advertisements vis àvis each consumer, which genuinely corresponds to his expectations and to his concerns, and gifts tailored to the tastes of each.

Thus, document WO-02/73967 discloses a method of marketing for interactive systems, in which viewers of contents transmitted by broadcasting, that is to say transmitted simultaneously and uniformly to a large number of receivers, earn points by responding to events presented during the transmission (the viewers thus attest to the following of several episodes or advertisements). These points can be exchanged for products or services, a website enabling information to be obtained on the points accumulated and the gifts available.

International application WO-02/56530 describes a method of tracking and of rewarding activities performed by individuals, such as participating in unveilings of prerecorded videos, visits to certain shops or connections to Internet sites. Rewards are granted in the form of points, which can be used to obtain goods and services.

Document WO-02/35433 sets forth a commercial method based on a monetary exchange by means of a client/server software engine. According to this method, advertisers promote products and services to targeted consumers, giving them credits and coupons when these consumers watch certain advertisements, participate in advertising activities (on-line or off-line) or undertake specific purchases. These credits and coupons can be spent or exchanged for contents, products or services. In particular, they can be used to acquire broadband contents, video on demand (VOD) or pay-per-view television (PPV)—cf. p. 5, l.19-26 and p. 14, l.5-9.

It is thus seen that, using these techniques, new business models relating to the obtaining of vidio or audio contents can take off. These models offer the free or reduced-price acquisition of such contents in exchange for predefined operations performed by consumers, listed in the prior documents cited (in particular, watching or listening to advertisements or consulting promotional Internet pages). The on-line exchanges render facilities of this type particularly practical and attractive. Specifically, the individuals consenting to these operations can choose and collect their goods directly, without waiting to have to go to shops or to receive future mail by post. For example, television viewers who have witnessed advertising programs and have aggregated enough credits obtain, by downloading, desired videos (VOD).

The development of exchanges of this type can also have the advantage of stimulating the markets for interactivity and VOD.

However, downloads of the contents earned may also entail a few drawbacks, since they might occupy a fairly wide bandwidth at the relevant individual's home for a relatively considerable duration. By way of example, if a 500 kbits/s ADSL (standing for "Asymmetric Digital Subscriber Line") link is fully available and if a video with a duration of 1 h 30 coded at 5 Mbits/s is transferred thereto, then 15 h of downloading is necessary in order for the individual to be able to retrieve it in full. In practice, the points earner would therefore have to ensure that his line is sufficiently available, initiate his download request and wait until the following day to be able to watch the desired film, while hoping that the quasi-exclusive demand for the line has not raised difficulties and that it will not all have to be done again in agreement with the provider of the video.

SUMMARY OF THE INVENTION

These drawbacks of transmission might ultimately induce credit holders wishing to acquire files (audio, video or like) to prefer the traditional postal routes, which, although theoretically longer, may turn out to be safer and less cumbersome than a teletransmission. From the point of view of content providers, it would then seem desirable to provide for such posting, at least as an option, so as to make the points-based motivation system sufficiently attractive. However, this solution entails additional fees for management, for posting of mail and for storage container costs.

The present invention relates to an acquisition device for obtaining files by accumulation of points, that is able to offer the advantages of the teletransmission of files and also those of fast and reliable delivery.

The invention also has as subjects an acquisition process for obtaining files, an interactive terminal and a computer program exhibiting the above assets.

It applies in particular to the field of interactive television, but also relates to interactive radio and communication via wide area networks or WANs or via Internet. Moreover, the invention applies more particularly to the field of advertising, but also comes in particular within the realm of marketing initiatives and opinion polls.

For this purpose, a subject of the invention is an acquisition device for obtaining files by accumulating points, designed for at least one user of at least one receiver of data of at least one communication network. This user is able to earn points by occurrences of at least one predefined operation accomplished by this user, and to acquire at least one of the files by downloading of this file via the communication network when the aggregate number of points reaches a predetermined level associated with this file.

According to the invention, at device comprises an automatic control module for ordering downloading via the network to a storage space accessible to the receiver, of portions of this file, designed to order the downloading of each of the portions when the number of points earned by the user reaches a fraction of the predetermined level which corresponds to this portion.

Thus, the device of the invention is suitable for implementing a downloading in several steps of the file earned by the user, each step corresponding to an intermediate level of points earned. The portions of file may be appended to one another as they are received, so as to progressively reconstruct the complete file. Eventually, when the number of points earned reaches the level required to obtain the file, the user can without delay get the whole of this file and utilize it unrestrictedly. For example, he then has the option of listening to the music, watching the film, or consulting the encyclopaedia, that he has received by download as a reward for his availability.

The splitting up of the downloaded file affords a very flexible margin of manoeuvre for quantitatively metering the contents of the dispatches. It is thus possible to contrive matters such that at each downloading step, the transmission is of short duration and/or occupies a reduced bandwidth. This implementation is made possible by the progressive and staggered mode of allocating points. Moreover, the user does not need to choose an appropriate moment to trigger a download, hoping that everything will be alright, since the device of the invention enables automatic transmission of the file piece by piece.

This splitting technique contrasts with the existing methods, in which the accumulation of points is perceived as a whole giving entitlement to advantages with regard to products or services in full, and in which the points are envisaged exclusively in financial terms.

Herein, "file" is understood to mean a structured set of information that constitutes a unit. Implicitly important aspects of the invention are the preselection of such a file and its interrelation with a predetermined number of points, which allow the steps of automatic downloading by portions. The selection of the file to be earned can be made in particular by the user, for example from a promotional list, or by the organizer of an advertising campaign rewarded by surprise gifts.

Advantageously, the automatic control module is designed for ordering the downloading of video files coded according to one of the MPEG (standing for "Moving Picture Experts Group") standards, possibly consisting in particular of the MPEG-2, MPEG-4 or MPEG-1 versions, or of audio files coded according to one of the MP3 (standing for "MPEG1 Audio Layer 3") standards, including in particular the MP3Pro version.

The predefined operations accomplished by the users may be all kinds of operations in which the distributor of the files or an entity involved in his services has an interest. They may in particular carry a commercial value (watching or listening to advertisements, purchasing specific products on-line, participating in market surveys, etc), informational value (responding to polls, contributing to studies, etc) or recreational value (lucky draws on the Internet, televized games, etc). Moreover, they may be performed on-line or off-line: for example attending commercial presentations can be remunerated with a certain number of points.

The operations preferentially consist in viewing or listening to advertisements, consulting Internet sites and/or responding to questionnaires by telecommunication. It is then practical for the interactive applications making it possible to earn points to be identified by a specific indicator, for example by a special icon. For example, the user initiates an interactive application comprising several pages or video sequences showing specific features of a product, and earns one point per page or sequence viewed.

Moreover, the acquisition device advantageously comprises a module for detecting the occurrences of the predefined operations, which is applicable to on-line operations.

The points level necessary for acquiring a file is preferably fixed in advance by the service provider. This level may in particular comply with specific criteria:
  by associating each point with a given amount of information, expressible in particular as bytes or as data packets,
  by assigning a higher or lower value depending on the type of compression (for example 30% of points extra for an MPEG4 version than for an MPEG2 version of the same size),
  and/or by allocating a higher or lower value depending on how in vogue the films or music are.

In a variant implementation, the number of points necessary to acquire a file comprises a random component, drawn by pot luck within the context of a game before the first downloading step.

In first advantageous forms of embodiment of the data receiver, the latter is an interactive terminal, for television or for radio. Such a receiver can in particular consist of a decoder box, generally called an STB (standing for "Set Top Box"). According to a second advantageous form, it is a computer terminal, of the personal computer type (PC). In a third advantageous form, the receiver serves a set of terminals, for example a group of appliances in a domestic network (the points may be aggregated by carrying out operations on the various terminals) or a set of terminals of a collective sharing storage and processing resources (the points are pooled and the files earned are available for all).

The storage space accessible to the receiver may or may not be incorporated into this receiver. In particular, it can consist of a hard disk integrated into an interactive terminal, such as for example an STB marketed by the company Tivo or the company ReplayTV. In another embodiment, it consists of a storage resource of a server, accessible through an interactive terminal via a network (for example a digital domestic network or DHN—standing for "Digital Home Network").

The network for transmitting the files can be any type of communication network, in particular over the airwaves, by cable, by satellite, or by DSL (standing for "Digital Subscriber Line"). Moreover, a receiver may be able to receive the files via two or more networks.

For example, an interactive television is connected to a service operator by a return path (by way of illustration: ADSL-based Internet network) and receives programs by radio transmission. The files may then be sent via one or the other of the two paths, according to the procedure employed. It is even possible to use the two networks alternately to communicate one and the same file, in particular to take account of acquisition schemes preferred by the user at the time of the transmissions, or to take into consideration problems of reception via one of the networks (line busy, poor antenna reception, etc). In the latter case, it is desirable to provide an automatic acknowledgement of receipt via the return path.

The acquisition device of the invention constitutes a functional entity, which is advantageously implemented in the receiver (in software or integrated circuit form) or in a stand-alone system linked to the receiver. This implementation, usefully combined with security mechanisms aimed at preventing fraudulent practices, allows local processing of the management of the points earned and of the downloads. One thus avoids having to install a centralized system for tracking the points and the portions downloaded, which is awkward to employ and requires complex resources.

In another form of implementation of the acquisition device, the latter is implemented at the level of the sender. This embodiment allows centralized management of the accounts of the various users, and thus gives useful information on the behaviour of the latter while permitting secure checking of the acquisition procedures.

The file acquisition device advantageously comprises a module for prior selection of at least one content by the user, the downloaded file carrying this content. The product earned is thus customized as a function of the user's desires, the selection possibly being made for example from an on-line catalogue, or from a promotional offer.

Preferably, the module for prior selection allows the user to select at least two contents, and the device comprises a module for apportioning the points earned into at least two accounts associated respectively with these contents. In this way, the user acquires in parallel and progressively several products selected through their own careful consideration.

According to a preferred form of apportioning of the points, the acquisition device comprises a module for allocating priority designed to permit the user to choose an order of priority of assignment of the points earned to the accounts. It is useful for it to be possible to invoke this allocation module dynamically, as soon as the user so desires. In this way, the order of priority can change on the way. For example, a consumer favours the acquisition of a piece of music that was ranked in third or fourth position, over the other products requested, since the number of points recently obtained is sufficient for him to complete his acquisition of this piece of music.

In the presence of the module for allocating priority, the apportioning module is advantageously designed:
  to assign the points earned to the account benefiting from the highest priority,
  and when the aggregate number of points in respect of the account benefiting from the highest priority reaches the predetermined level, to assign the additional points earned to the accounts having lower priorities, according to the order of priority chosen.

In practice, therefore, only the first account benefits from the newly earned points, except when it becomes complete so as to obtain the intended product. In this latter case, the remaining points are then assigned entirely to the second account, unless the latter becomes in its turn complete. The same process is thus repeated until all the points earned last have run out.

According to another scheme of embodiment of the apportioning module in the presence of the module for allocating priority, the points are apportioned pro rata on the basis of the priorities indicated, either according to a predefined algorithm, or according to criteria fixed by the user. For example, the latter himself fixes percentages of apportionment (by way of illustration: 50% for the priority product, 25% for the next, 15% then 10% respectively for the last two, rounded to the higher whole value with distribution of the points in the order of priority of the accounts).

The file acquisition device preferably comprises a module for recording the aggregate number of points in respect of the acquisition of each of the files and a module for communicating this aggregate number to the user. The user can thus be informed, for example by screen display of bars with progressive infill, or by message transmitted verbally, of the current state of his points accounts.

Preferably, the ratio of sizes of each of the portions of file with respect to this file is equal to the ratio of the number of points of this fraction associated with this portion with respect to the predetermined level for this file. This implementation is beneficial through its simplicity, since it complies with a rule of three.

In practice, it is possible to undertake the calculation in terms of bytes or of packets of data of the file. It suffices for the distributor to divide at the start the number of these units in the file by the number of points that are associated with this file, to ascertain the file share gained through each point earned. For example, for a file of 3 Gbits requiring 3000 points, each point gains 1 Mbit. Moreover, the ratio of sizes can be rounded to an immediately higher value (or immediately lower, depending on the choice of the provider or of the service operator), so as to facilitate the partitioning of the file (for example to obtain a whole number of packets in each portion).

It is advantageous for the automatic control module to be designed to order downloading on each of the occurrences of the predefined operations. The downloading of the file is thus maximally scaled. In other modes of implementation, one waits to have aggregated a certain number of points, and/or possibly of occurrences, so as to trigger each of the downloads of the portions of the file. One thus avoids having to carry out downloads for tiny portions of the file.

The invention applies also to an acquisition process for obtaining files by accumulation of points, corresponding to the device of the invention and preferably deployed by means of one of the modes of implementation of this device.

The invention relates moreover to an interactive terminal wherein it comprises a file acquisition device in accordance with any one of the forms of implementation of the invention.

The subject of the invention is also a computer program product comprising program code instructions for the execution of the steps of the acquisition process of the invention when this program is executed on a computer. The expression "computer program product" is understood to mean a computer program medium, which may consist not only of a storage space containing the program, such as a diskette or a cassette, but also of a signal, such as an electrical or optical signal.

BRIEF DESCRIPTION OF THE DRAWINGS

The invention will be better understood and illustrated by means of the following wholly nonlimiting exemplary embodiments and implementations, with reference to the appended drawings in which.

DESCRIPTION OF THE PREFERRED EMBODIMENTS

The functional entities described and illustrated do not necessarily correspond to physically distinct entities, but may for example consist of functionalities of one and the same piece of software or of circuits of one and the same component. Conversely, one and the same module may be implemented in the form of several physically separate entities.

A communication assembly (FIG. 1) comprises a general transmission centre 2, or "broadcaster", broadcasting programs via a network 5 to interactive terminals, such as a terminal 1. The network 5 can be a monodirectional network, based for example on radio transmission or on transmission via satellites, or a bidirectional network, consisting for example of cable or DSL. The broadcaster 1 is linked in a constant manner to a service operator 3, able to communicate with the terminal 1 via a bidirectional network 6. The operator 3 does not necessarily communicate directly with the terminal 1 and may do so by way of entities under his control, such as servers. Moreover, the terminal 1 has access to a data server 4 via a bidirectional network 7, which is based for example on the internet network. A user of the terminal 1 conventionally exchanges information with the service operator 3 and the server 4 by means of a user interface 12.

Figure 1:
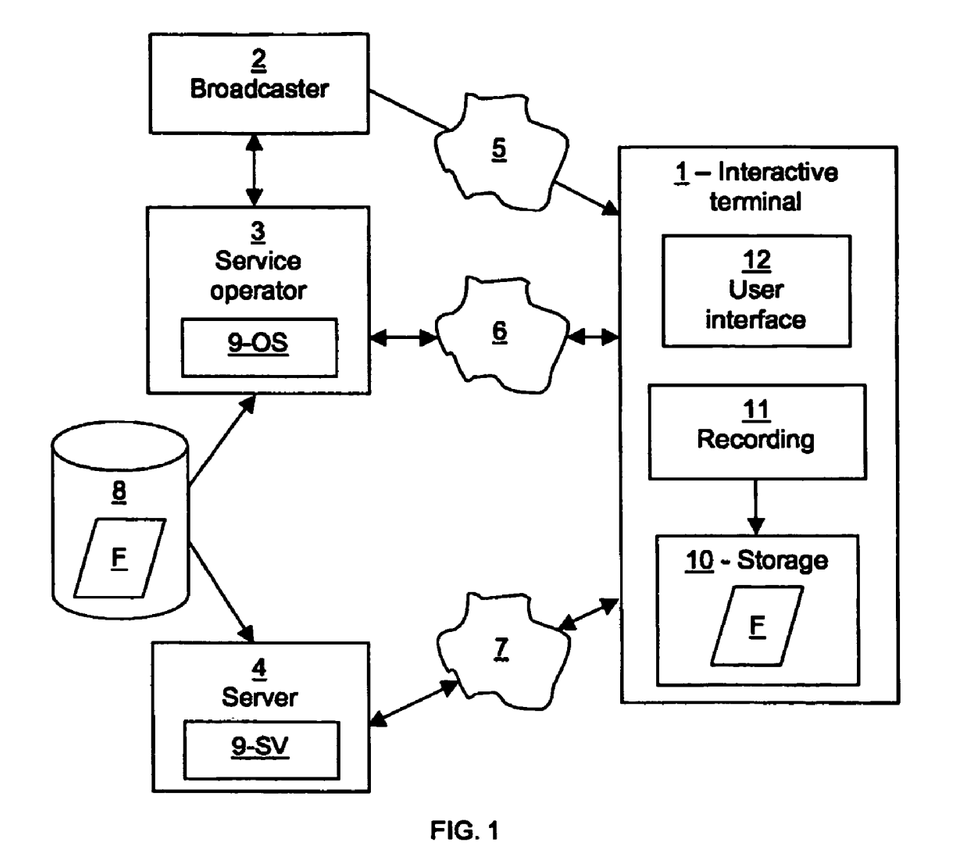
FIG. 1 is a basic diagram of a communication assembly including an interactive terminal and provided with a file acquisition device according to the invention.

The communication assembly is designed to allow the terminal 1 to acquire files F by accumulation of points, that the user earns by performing predefined operations (for example by consulting advertising pages or by responding to commercial questionnaires). The files F are stored in a database 8 accessible by the operator 3 and/or the server 4. The latter (or at least one of them) are respectively furnished with download modules 9, denoted 9-OS and 9-SV, that make it possible to transfer the files F from the base 8 to the terminal 1. The transmissions made by the service operator 3 may be conducted either directly via the network 6, or by broadcasting via the network 5, by registering specific actions within a playlist of the broadcaster 2. A recording module 11 allows the terminal 1 to store the files F thus downloaded in a storage space 10.

The file F acquisition functionalites of terminal 1 will now be explained (FIG. 2), in a presentation not related to a particular implementation. These functionalities, brought together in a file acquisition device 20, are therefore not at this juncture of the description brought together within a particular system, be it the broadcaster 2, the operator 3 or the terminal 1. In fact, the acquisition device 20 may be integrated in various ways, either into one or other of the systems, or designed in isolation in conjunction with at least one of them, or else dispersed among several of them. A more precise implementation with integration into the terminal 1 will be developed later.

Figure 2:
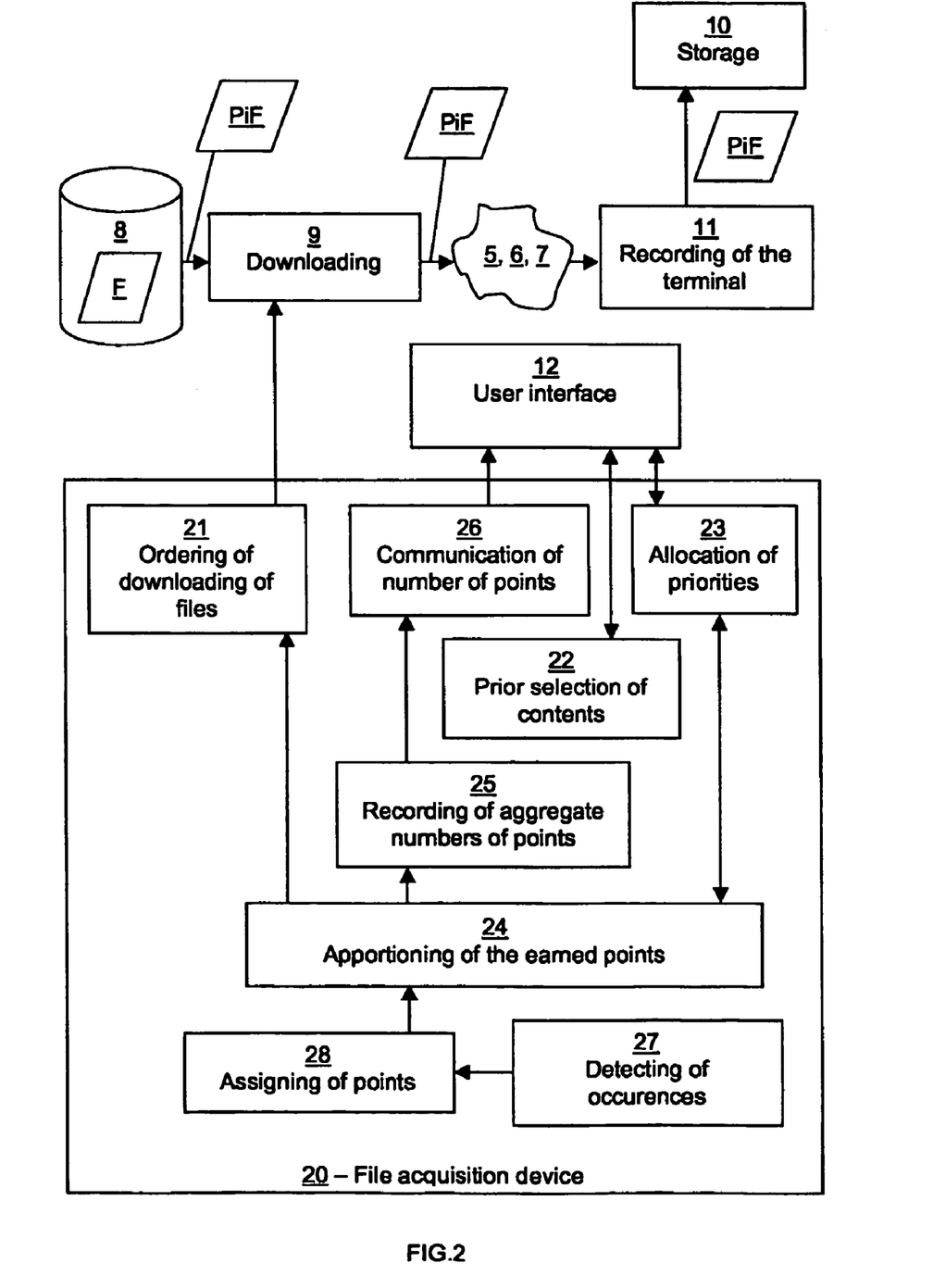
FIG. 2 details the acquisition device of FIG. 1, in conjunction with entities with which it is communicating.

The acquisition device 20 comprises a control module 21 for ordering the downloading of the files F, capable of acting on the download module(s) 9 and a module 22 for prior selection of contents C, permitting the user of the terminal 1 to choose via the user interface 12, the contents to be acquired—each content C being associated with one or more of the files F.

The acquisition device 20 also comprises a module 27 for detecting occurrences of the predefined operations, which enable the user to earn points on each of these occurrences. Moreover, a module 28 for assigning the points is designed to assign the points earned to the various contents C selected by the user. More precisely, the user is able to express his preferences on the priorities to be accorded to the contents C that he wishes to acquire, by means of a module 23 for allocating priority (via the user interface 12). A module 24 for apportioning the points earned is capable of apportioning the points that the user has just earned, according to the instructions of the assignment module 28, as a function of the commands given by means of the module for allocation 23 on the order of priority.

The acquisition device 20 also comprises a module 25 for recording the aggregate numbers of points for the various contents C, and a module 26 for communicating these numbers to the user, via the user interface 12.

One of the features of the acquisition device has to do with its mode of downloading the files F. The module for ordering downloading 21 is in fact designed to order the downloading of portions PiF of the files F (with i=1, 2. . . n), as a function of the points earned and as the user accumulates these points. The complete files F are therefore retrieved only after several download steps (n steps).

Figure 3:
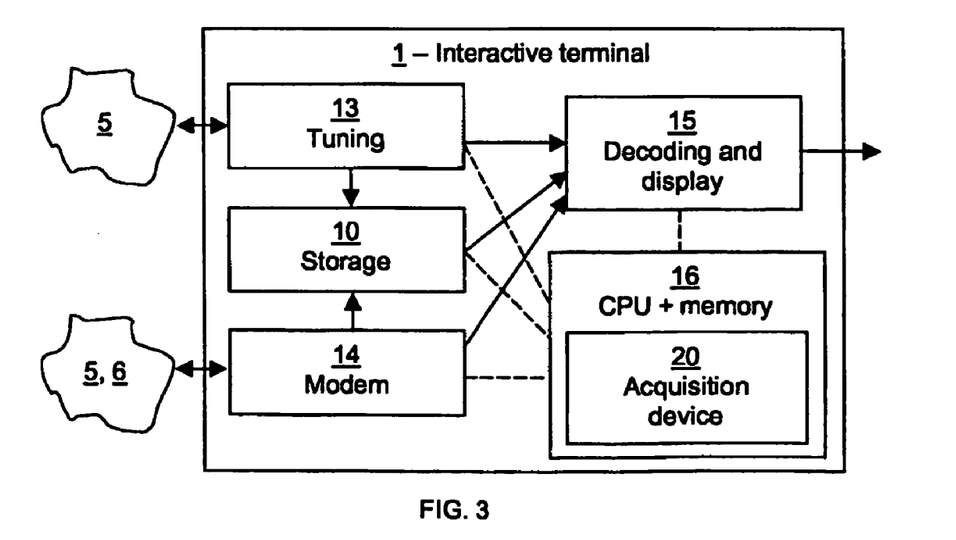
FIG. 3 represents in a more complete manner the interactive terminal of FIG. 1, in a particular embodiment in which the acquisition device of FIGS. 1 and 2 is incorporated into the interactive terminal.

In an exemplary deployment detailed hereinbelow, the entire set of functionalities of the file acquisition device 20 is implemented in the interactive terminal 1. The terminal 1 (FIG. 3) comprises, in addition to the storage space 10 (consisting for example of a built-in hard disk):

means 13 of tuning in reception in the broadcasting network 5 (for satellite, cable or terrestrial communications, depending on the type of the network 5), a modem 14 (broadband or simply PSTN—standing for "Public Switched Telephone Network"), decoding and display means 15, and data processing means 16, including the central processing unit (CPU) and also incorporating the file acquisition device 20.

This terminal 1 is typically a PDR.

In variant implementations, the tuning means 13, the modem 14 and/or the storage means 10 consist of hardware modules external to the terminal 1, and communicate with the latter via a digital domestic network (DHN).

Typical sequences for acquiring the files F are the following:

the user of the terminal 1 watches the television normally (transmissions sent via the network 5); he has an initial credit of 985 points for a first content C1, to be acquired for 1000 points, in the form of a subscription video on demand (SVOD); it is assumed that the user also benefits from a second account with 250 points to acquire a second video content C2, worth 650 points;

the user selects (selection module 22) a third content C3, of the audio type (a song), to be acquired for 100 points; however, he maintains the priorities on the first and the second contents C1 and C2 (priority allocation module 23);

he resumes watching the television normally;

he receives a sponsored interactive application, that enables him to earn 10 points (occurrence detection module 27 and assignment module 28), these points being automatically allocated to the acquisition credit for the first content C1 (apportioning module 24); he then has 995 points for the corresponding account;

while the user resumes watching the television normally, a portion of 1% of a file F1 corresponding to the first content C1 is downloaded (control module 21) and is recorded in the storage space 10 (recording module 11); this portion supplements that part of the file F1 already acquired previously, representing 98.5%;

he receives a sponsored interactive application, that enables him to earn 15 points; he therefore has 1010 points, sufficient to acquire the first content C1 and benefit from a surplus of 10 points;

while the user resumes watching the television normally, the missing portion of the file F1 is downloaded, that is to say the remaining 1.5%; the additional 10 points are automatically allocated to the acquisition of the second content C2 (apportioning module 24) and form the subject of a step for downloading an associated file F2; the downloaded portion of file F2 represents 1.54% of the total;

the user has very rapidly obtained the 1.5% of file missing in respect of the first content C1, and can now watch it without waiting.

Figure 4:
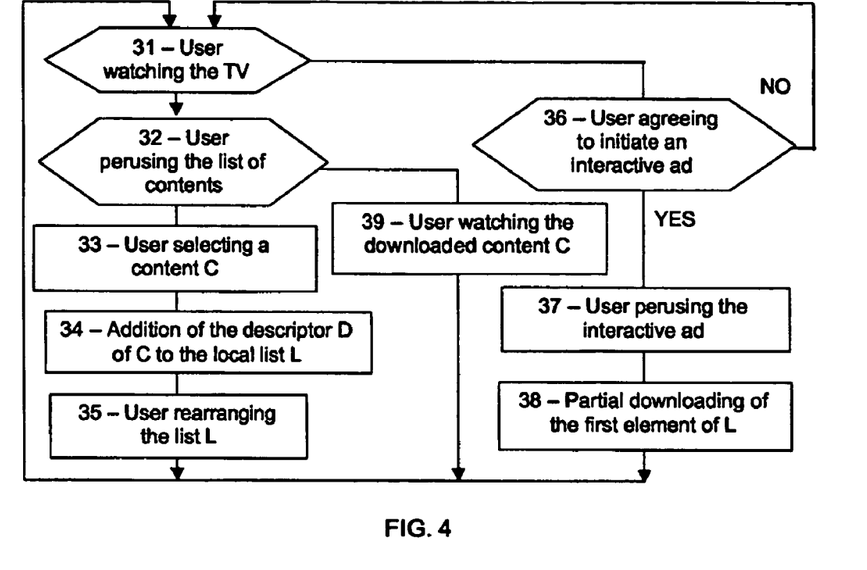
FIG. 4 is a flowchart giving the main steps for acquiring files with the acquisition device of FIG. 1.

This procedure may comply in a general manner with an algorithm of the following type (flowchart of FIG. 4):

user watching the television (step 31);

first bifurcation branch—user initiating a menu for selecting contents (for example SVOD and/or music) and perusing therein a list of contents available (step 32);

first bifurcation sub-branch from the perusal of the list (of step 32)—user selecting a content C (step 33), a descriptor of this content C being appended to a local list L (step 34) and user rearranging the list L as a function of his priorities (step 35);

a second bifurcation sub-branch from the perusal of the list (of step 32)—user watching one of the contents C already downloaded (step 39);

second bifurcation branch, in case of reception of an interactive advertisement—user agreeing to initiate an interactive advertisement (step 36) and perusing this advertisement (step 37) and partial downloading of the first element of the list L (priority content), corresponding to the number of points acquired (step 38).

The content selection step 33 proceeds for example in the manner alluded to below. The user has seen an advertisement in a newspaper relating to a music album available in the MP3 format or a recent film available on DVD, video rental and VOD. He asks himself if it is possible for him to obtain it without paying. By means of a dedicated (resident application) graphical user interface (GUI), he then browses through a content selection menu offering a kind of catalogue of contents sponsored by advertisers. To find the desired piece of music or film, the user can peruse specific lists, giving for example the years of release or the names of composers or of artists, actors or directors.

Figure 5:
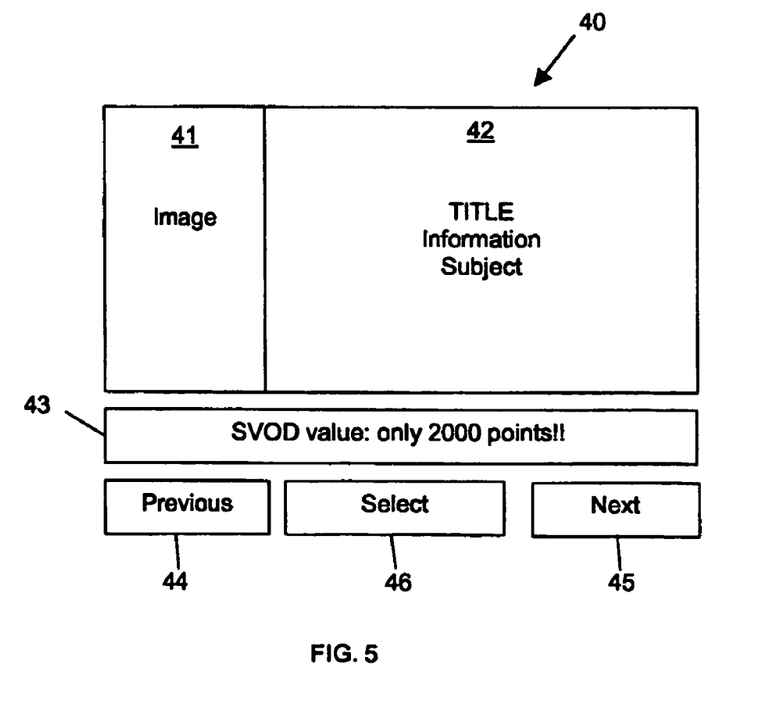
FIG. 5 shows a screen snapshot with content selection menu, obtained with the acquisition device of FIG. 1.

If in this way the user succeeds in identifying the desired title from among the films available for example, he can have information displayed about this title, including in particular the number of points required to be able to obtain it. For example (FIG. 5), on the screen there appears a structured set 40 of information including a first window 41 showing an image from the film, a second window 42 giving the title, particulars (director, screenplay writer, distribution, etc) and a summary and a third window 43 indicating the number of points to be earned to acquire the film, as well as browsing windows 44, 45 and 46 making it possible respectively to consult the previous and next films in the current list and to select the film presented on the screen.

In a first form of embodiment of the content selection GUI, the latter is a built-in executable application ("native built-in application"). In a second form of embodiment, it is an interactive application downloaded from the broadcaster 2 or from the service operator 3; this makes it possible to attract the user and to induce him/her to watch the interactive advertisements. In a third mode of embodiment, the GUI takes the form of web pages controlled by the operator 3.

In addition to an identification of the contents C to be downloaded, the local list L of contents retains other particulars such as the number of points and the title that are associated with each content. This entire set of information is structured in the form of descriptors, for example of the following form:

```
class ContentDescriptor {
    String title;              // Title to be displayed for the user
    Icon icon;                 // Icon to be displayed for the user
    String info;               // Information to be displayed for the user
    URL DownloadAdress;        // Address from which to download
    Int value;                 // Number of points to be acquired to obtain
                               // the content C
    Int pointsGot              // Number of points already acquired
    StorageAdress reference;   // Local storage address for the content C
```

Figure 6:
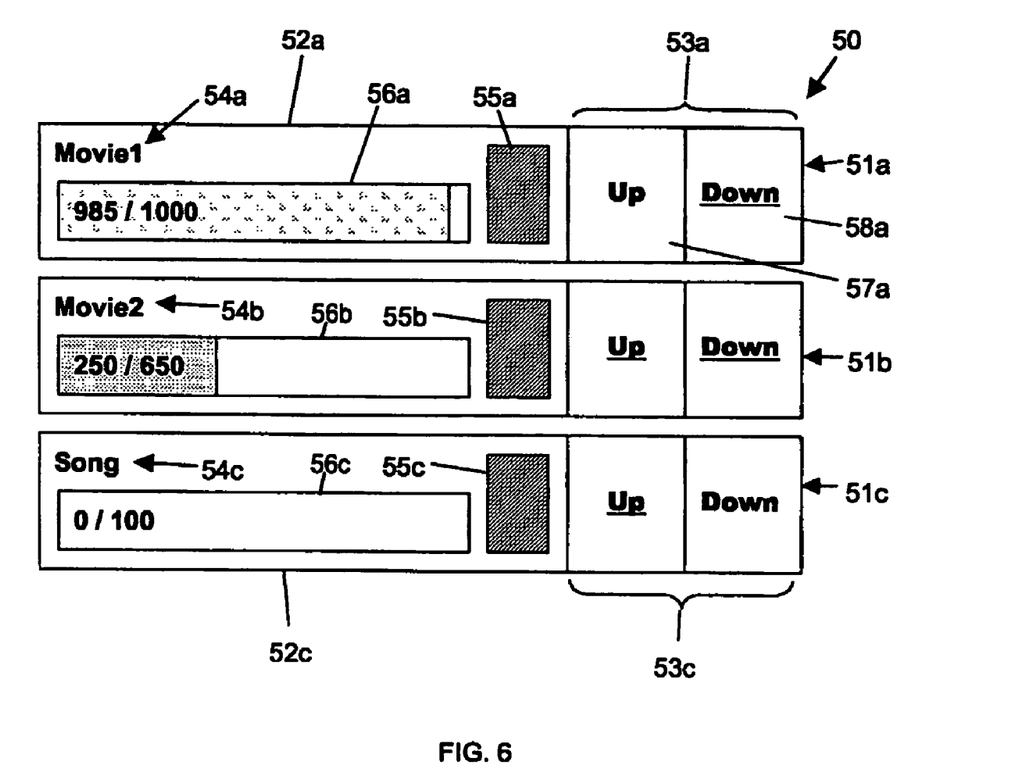
FIG. 6 shows a status menu of a list of selected contents, which is obtained with the acquisition device of FIG. 1.

The step 35 of arranging the list L is performed by the user by way of the priority allocation module 23, and makes it possible to assign the points earned to one or other of the contents C selected. This arrangement is performed by virtue of a menu 50 entitled "Content List Status" (FIG. 6), which exhibits for example several rows 51a, 51b and 51c (generic notation: 51) associated respectively with the contents C1, C2 and C3 of the list L (in the example represented: two films "Movie 1" and "Movie 2" and a piece of music "Song") and ranked from top to bottom in order of priority. Each of these rows 51 comprises (the references 52 to 56 being provided with the suffixes a, b and c respectively as a function of the relevant content C):

the title 54 of the content, an image 55 representative of the content, and a bar 56 indicating the number of points already earned with respect to the number of points required to obtain the file completely, and depicting the level of acquisition (current status of download) through a progressive filling of the bar.

Each of the rows 51 also comprises a priority control box 53, split into an "up" virtual button 57 and a "down" virtual button 58 (the references 57 to 58 being provided with the suffixes a, b and c respectively as a function of the relevant content C). The user can rearrange the rows by moving them, simply by pressing (that is to say select and click) the appropriate buttons 57 and 58, the up button 57a of the upper row and the down button 58c of the lower row being deactivated. For example, by selecting the up button 57b for the film "Movie 2", the user shifts the associated row 51b to first place, so that all the points earned subsequently will be allocated to this content.

The interactive advertisement initiated and perused during steps 36 and 37 comprises several pages through which the user can browse: product presentation, features, price, etc. Each page enables the user to earn points. The interactive application can also include a hyperlink to a company website, which the user can browse to obtain more information, and also more points. At the end of the application or when the user exits this application, the local quantity of points is increased by the number of points newly earned. This addition begins the download of step 38.

The partial download of step 38 is always done on the first element of the local list L, except possibly in a case where the accounts for several contents C would be completed in the course of one and the same earning of points. The terminal 1 orders the transfer of several bytes of content, as a function of the number of points earned and of the cost in points of the contents to be downloaded. These bytes are then aggregated with the already-obtained part of file F (recording module 11) and when the file F is completely transferred, the user is notified that this new content C is available locally.

For MPEG2 video contents, for example, the partitioning of the file F is performed packet by packet, so that the smallest element to be transferred is an MPEG packet. During a download, the terminal 1 aggregates the newly transferred packets with the packets already stored in the storage space 10, and this suffices to increase the sequence. Thus, no additional calculation is necessary, only the following instructions: openFile, append, writeFile and closeFile.

The above procedures for accumulating points and for downloading corresponding portions of the files F are vulnerable to piracy. This is why the mechanisms employed are made secure so as to prevent a user from himself increasing the quantity of points earned or from duping the module 21 for ordering downloading regarding the portion of file to be transferred. Known techniques can be employed for this purpose.

Figure 7:
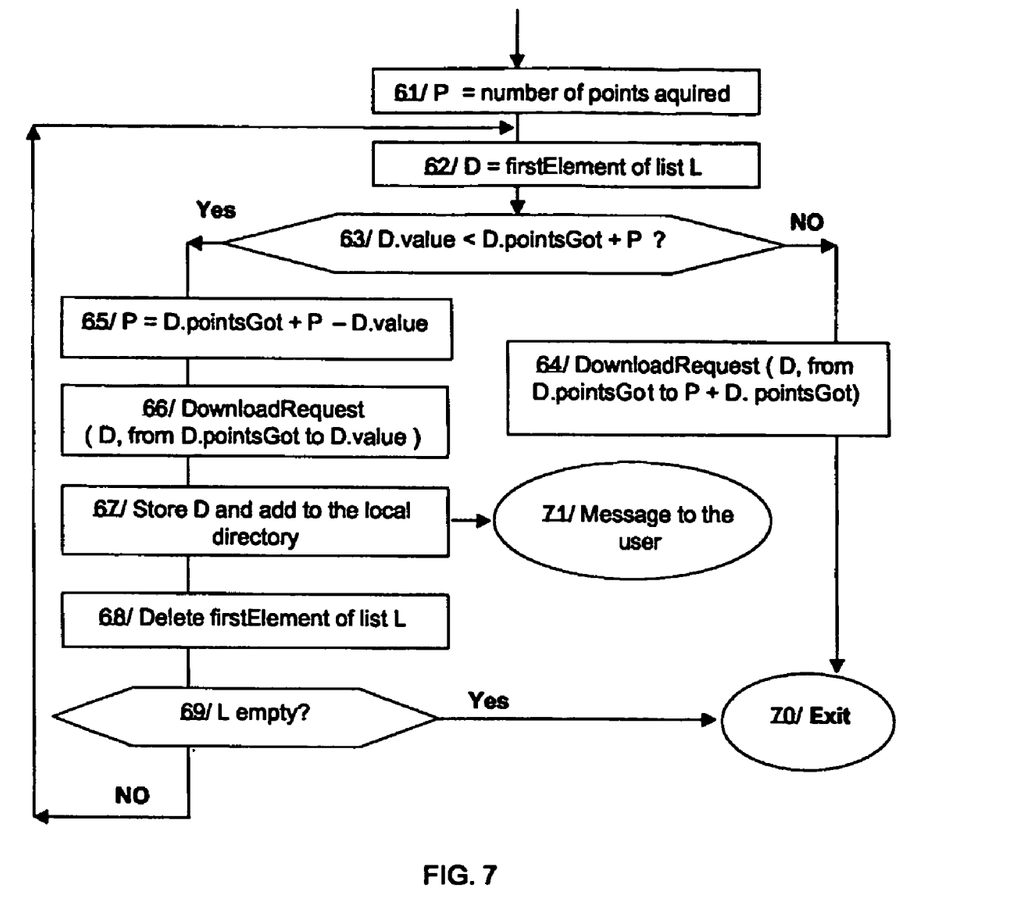
FIG. 7 is a flowchart detailing acquisition steps of the flowchart of FIG. 4.

The way in which the points are credited to the user and in which the partial downloading is ordered is made explicit below (FIG. 7). A variable P is assigned the number of points just earned (step 61) and a content descriptor variable D is assigned the first element of the local list L, denoted "firstElement" (step 62). The descriptor D is for example in accordance with the structure described above. One then tests (step 63) whether the number of points required ("D.value") is less than the sum of the number of points already acquired previously ("D.pointsGot") and the number P of points newly earned:

<<D.value<D.pointsGot+P?>>

In case of negative response (the number of points recently earned is not sufficient to acquire the remaining part of the desired file F), the downloading of a portion PiF of the file F is triggered by means of the control module 21 (step 64). This portion:

corresponds to the fraction of points earned with respect to the total number of points required for this file F, according to a rule of three (rounded according to the unit of magnitude adopted for the partitioning of the file, for example data packets or bytes), and is consecutive with the portions P1F, P2F . . . P(i–1)F already downloaded previously.

The downloading is thus ordered by a request routine "DownloadRequest" pertaining to the descriptor D and giving the interval of the content C to be downloaded, between a start position corresponding to the portions already downloaded (D.pointsGot) and a finish position corresponding proportionally to the adding of the points earned with respect to this position (P+D.pointsGot):

DownloadRequest (D, from D.pointsGot to P+D.pointsGot).

The procedure is then closed by exiting the program ("Exit", step 70).

In case of positive response to the comparison of step 63 (one has therefore attained the number of points necessary for acquiring the remaining part of the file), P is assigned the number of surplus points with respect to the acquisition of the file, that is to say the result of the formula [D.pointsGot+P−D.value] (step 65). The downloading of the missing portion PnF of the file F is then ordered (step 66) by use of the DownloadRequest routine between a start position corresponding to the portions already downloaded (D.pointsGot) and the end of the file:

DownloadRequest (D, from D.pointsGot to D.value).

The descriptor D is then moved to permanent storage memory (for example into the storage space 10) and is added to the local content directory (step 67). The user is then advised that the content download has terminated and that the new content C is henceforth available locally (step 71). Then, the first element firstElement of the local list L is erased (step 68).

The next step consists in testing whether the local list L is or is not empty (step 69). If it is, the program is exited (step 70). In the converse case, the entire set of steps is repeated from the assignment to the variable D of the new first element firstElement of the local list L (step 62), using the surplus number of points for the previous acquisition, this number being saved in the variable P in step 65.

In a variant implementation pertaining to the earning of points (step 36 and 37, FIG. 4), instead of proposing an interactive advertisement, a questionnaire is submitted to the user. Each response is then valued in respect of a certain number of points, which depends on the question posed. Questions making it possible to earn points are for example: "How many cars do you have?", "Do you intend to replace them?" and "Do you prefer a French car or a foreign one?". The responses can be analysed and sold later for market research, in compliance with the legislation in force regarding consumer protection.

A benefit of this strategy is that the user, not only having the possibility of being relaxed at home and available when he responds to the questionnaire, but also being conscious of the advantages obtained, is able to respond more willingly and more completely than in traditional market research. The despatching of the responses to the service operator 3 is implemented automatically by the terminal 1 without any intervention on the part of the user, and in a manner which is transparent to him. The two methods of earning points are preferably both provided for in the file acquisition device 20.

Moreover, in a variant implementation, the file acquisition device 20 makes it possible to tie the operations that are gratifying for the users to the contents C that may be acquired (latching of the assigning of the points to certain contents, as a function of the types of operations whose occurrences are detected). The module 27 for detecting occurrences is thus capable of acting on the module 24 for apportioning the points earned. For example, on a sports channel, watching Thomson advertisements allows the downloading of only the sports documents sponsored by this company, and not of the generic contents.

According to another variant, pertaining to the downloading of the portions PiF of files, instead of ordering upon each earning of points the acquisition of the corresponding portion, the control module 21 triggers a download only when the number of points recently acquired reaches a predetermined ceiling (corresponding for example to 10% of the file F to be downloaded, or to a minimum number of bytes).

The invention claimed is:

1. Acquisition device for obtaining files by accumulating points, for at least one user of at least one receiver of data of at least one communication network, said user being able to earn points by occurrences of at least one predefined operation accomplished by said user, and to acquire at least one of said files by downloading of said file via said communication network when the aggregate number of said points reaches a predetermined level associated with said file, said device comprises an automatic control module for ordering and downloading portions of said file via said network, where said automatic control module operates without user operation;

said automatic control module orders the downloading of portions of said file when the number of points earned by said user reaches a fraction of said predetermined level of said file such that said fraction also corresponds to the downloaded portions of said file and the downloaded portions of said file are less than the entire file;

said fraction is greater than zero and less than one; and a storage means, accessible to said receiver, which stores portions of said file.

2. Acquisition device for obtaining files according to claim 1, wherein it comprises a module for prior selection of at least one content by said user, said downloaded file carrying said content.

3. Acquisition device for obtaining files according to claim 2, wherein the module for prior selection allows said user to select at least two contents, and said device comprises a module for apportioning said points earned into at least two accounts associated respectively with contents.

4. Acquisition device for obtaining files according to claim 3, wherein it comprises a module for allocating priority designed to permit said user to choose an order of priority of assignment of the points earned to said accounts.

5. Acquisition device for obtaining files according to claim 4, wherein the apportioning module is designed to assign the points earned to the account benefiting from the highest priority, and when the aggregate number of points in respect of the account benefiting from the highest priority reaches said predetermined level, to assign the additional points earned to the accounts having lower priorities, according to said order of priority.

6. Acquisition device for obtaining files according to claim 1, wherein it comprises a module for recording the aggregate number of points in respect of the acquisition of each of said files and a module for communicating said aggregate number to said user.

7. Acquisition device for obtaining files according to claim 1, wherein the ratio of sizes of each of said portions of file with respect to said file is equal to the ratio of the number of points of said fraction associated with said portion with respect to said predetermined level for said file.

8. Acquisition device for obtaining files according to claim 1, wherein the automatic control module is designed to order said downloading on each of said occurrences.

9. Acquisition device for obtaining files according to claim 1, wherein the automatic control module is designed to order the downloading of files of at least one of the following types: MPEG video files and MP3 audio files.

10. Acquisition device for obtaining files according to claim 1, wherein it comprises a module for detecting said occurrences.

11. Acquisition device for obtaining files according to claim 10, wherein said operations are chosen from at least one of the following operations: viewing of advertisements, listening to advertisements, consulting of Internet sites and responses to questionnaires by telecommunication.

12. Acquisition process for obtaining files by accumulating points comprising the steps of:

earning points by a receiver of data coupled to a communication network by having a user accomplish at least one predefined operation, having said receiver acquire at least one of said files by downloading of said file via said communication network when the aggregate number of said points reaches a predetermined level associated with said file, said receiver downloading via said network to a storage space accessible to said receiver, portions of said file are ordered automatically without user intervention by ordering the downloading of each of said portions when the number of points earned by said user reaches a fraction of said predetermined level such that said fraction also corresponds to the downloaded portions of said file and the downloaded portions of said file are less than the entire file; and said fraction is greater than zero and less than one.

13. Interactive terminal wherein it comprises an acquisition device for obtaining files in accordance with claim 1.

* * * * *